United States Patent [19]
Sato

[11] Patent Number: 6,163,653
[45] Date of Patent: Dec. 19, 2000

[54] CAMERA

[75] Inventor: Yoichi Sato, Yokosuka, Japan

[73] Assignee: Canon Kabushiki Kaisha, Tokyo, Japan

[21] Appl. No.: 09/386,047

[22] Filed: Aug. 30, 1999

[30] Foreign Application Priority Data

Sep. 3, 1998 [JP] Japan ................................. 10-249960

[51] Int. Cl.$^7$ ............................. G03B 7/08; G03B 13/36; G03B 17/18
[52] U.S. Cl. ........................ 396/121; 396/147; 396/234; 396/290
[58] Field of Search .................................. 396/121, 122, 396/123, 124, 233, 234, 147, 290

[56] References Cited

U.S. PATENT DOCUMENTS

| | | | |
|---|---|---|---|
| 4,309,091 | 1/1982 | Fukuhara et al. ....................... | 396/234 |
| 4,618,238 | 10/1986 | Maitani et al. ...................... | 396/290 X |
| 4,748,468 | 5/1988 | Fujino et al. ........................... | 396/147 |
| 4,974,007 | 11/1990 | Yoshida ..................................... | 396/121 |
| 5,189,460 | 2/1993 | Hayakawa ................................ | 396/123 |
| 5,659,814 | 8/1997 | Matsukawa et al. .................... | 396/121 |
| 5,745,810 | 4/1998 | Matsushima ........................ | 396/234 X |
| 5,930,533 | 7/1999 | Yamamoto ............................... | 396/121 |

Primary Examiner—W. B. Perkey
Attorney, Agent, or Firm—Robin, Blecker & Daley

[57] ABSTRACT

A camera includes a focus detecting device having a plurality of focus detecting points and capable of selecting a particular focus detecting point from among the plurality of focus detecting points, and a light measuring device having a plurality of light measuring areas. When performing a plurality of times of light measuring operations, the light measuring device converts, into a particular measured light value by using a preset calculating operation, a plurality of measured light values each of which is obtained at each time of light measuring operation in a light measuring area set correspondingly with selection of a focus detecting point in the focus detecting device.

19 Claims, 11 Drawing Sheets

CAMERA

BACKGROUND OF THE INVENTION

1. Field of the Invention

The present invention relates to a camera having a plurality of focus detecting points and a plurality of light measuring areas.

2. Description of Related Art

With an advancement of the recent technology, the number of areas in which an automatic focusing operation can be effected within a viewfinder field (hereinafter, the areas being referred to as focus detecting points, which are not merely points but has certain areas) tends to increase. Further, the number of light measuring areas also tends to increase according to the increase of the number of focus detecting points.

Moreover, according to the increase of the number of light measuring areas, an area of the measuring area per one cell is made smaller, and the so-called spot light measurement for light-measuring only an area of a few percentage in the viewfinder field is available not only in the center of an image plane, but also in marginal portions of the image plane.

Further, as one of light measuring modes, a multi-spot light measurement has been realized in which the measured light values obtained at a plurality of points within the image plane are stored in a storage medium in a camera and are then averaged.

However, in the case of the conventional multi-spot light measurement, an area in which the light measurement is available is only the central portion of the image plane. Therefore, it is necessary to move a camera up and down, as well as to the left and right so as to direct the camera to a part to be light-measured prior to determining a composition of photography, and thus the camera is not easily handled when photographing by using a tripod.

BRIEF SUMMARY OF THE INVENTION

It is an object of the present invention is to provide a camera which is capable of enhancing an operability thereof.

To attain the above object, in accordance with one aspect of the present invention, there is provided a camera having a plurality of focus detecting points and a plurality of light measuring areas, in which a measured light value in a particular light measuring area set according to selection of the plurality of focus detecting points is obtained, and a plurality of measured light values obtained by a plurality of times of light measuring operations are averaged.

The above and further objects and features of the present invention will become apparent from the following detailed description of preferred embodiments thereof taken in conjunction with the accompanying drawings.

DETAILED DESCRIPTION OF THE INVENTION

Hereinafter, preferred embodiments of the invention will be described in detail with reference to the drawings.

[First Embodiment]

FIGS. 1(a) to 1(c) to FIG. 6 show a first embodiment of the present invention.

Figure 2:
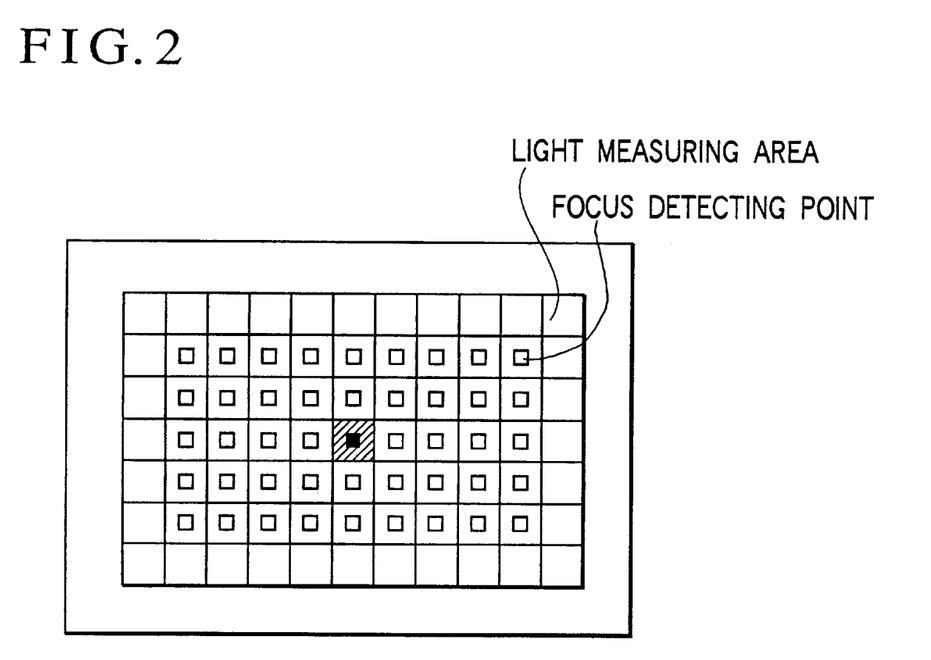
FIG. 2 is a diagram showing focus detecting points and light measuring areas in the first embodiment of the present invention.

FIG. 2 is a diagram showing focus detecting points and light measuring areas on a viewfinder field of a camera in the first embodiment. Smaller squares correspond to the focus detecting points, and larger squares correspond to the light measuring areas. The camera has a light measuring sensor of 77 divisions with 7 rows and 11 columns, and the focus detecting points have 45 points with 5 rows and 9 columns. In the camera in the first embodiment, 45 light measuring areas in which the focus detecting points respectively exist are available for the spot light measurement.

Figure 1A:
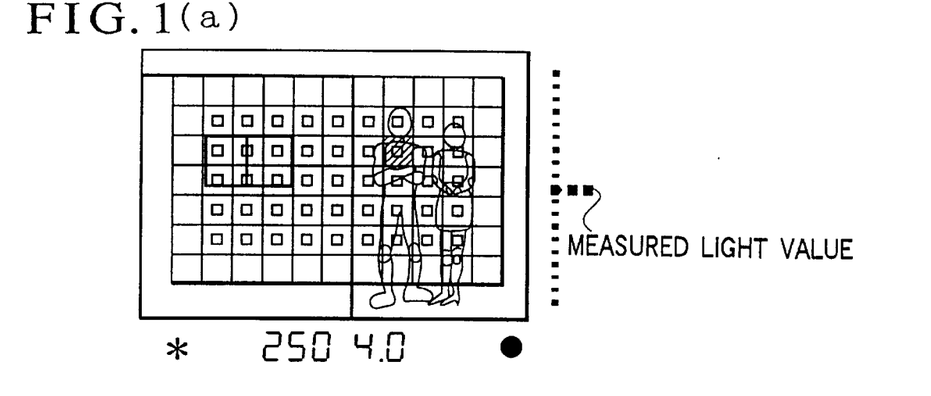
FIGS. 1(a) to 1(c) are diagrams showing the various light measuring states in a multi-spot light measuring mode according to a first embodiment of the present invention.
Figure 1B:
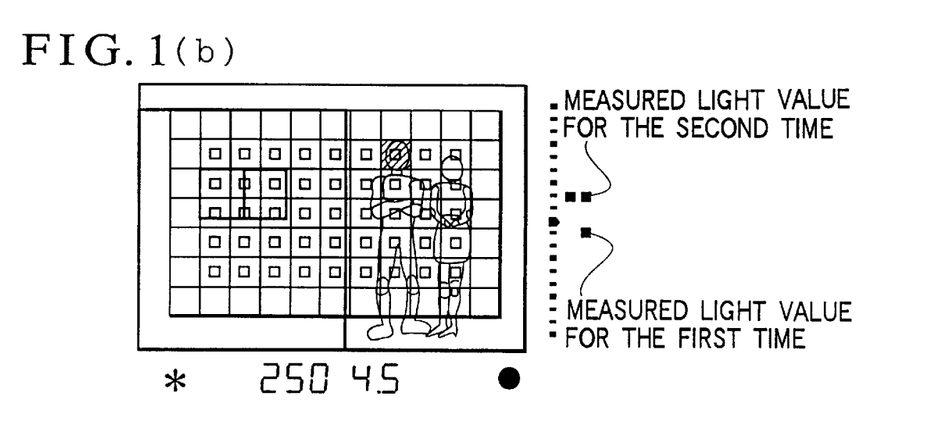
Figure 1C:
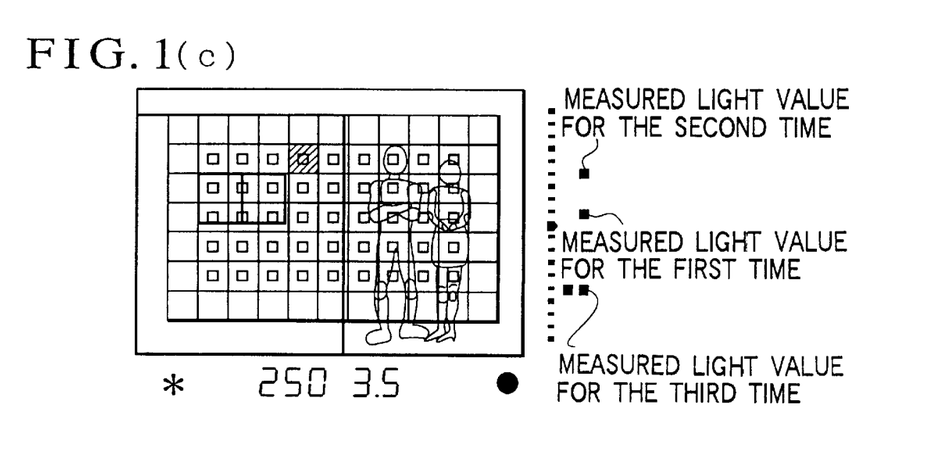

Referring to FIGS. 1(a) to 1(c), a multi-spot light measurement which is associated with the focus detecting points will be described.

In the case of an object to be photographed, such as that shown in FIGS. 1(a) to 1(c) (i.e., with the wall of the building being a background image, two persons exist on the right-half of the image plane), a light measurement for the first time is performed at the chest part of the person being on the left side.

Figure 4:
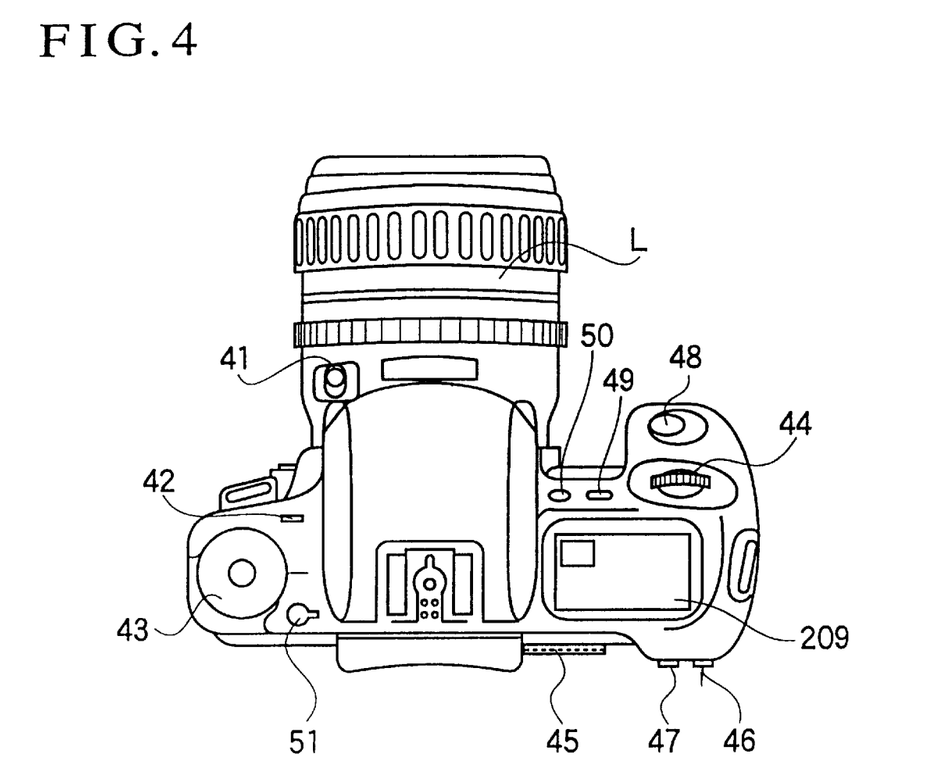
FIG. 4 is a top view of the camera in the first and second embodiments of the present invention.
Figure 4A:
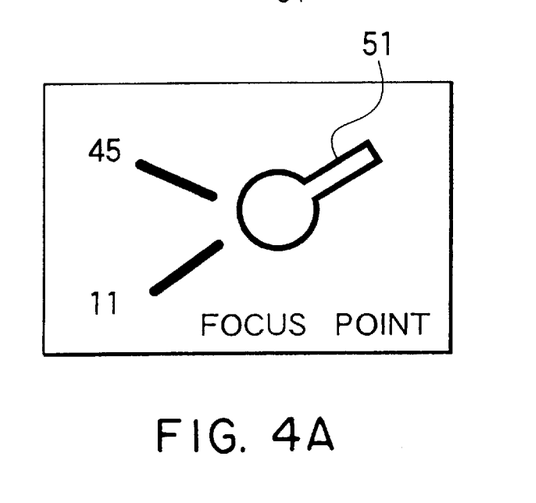

In this instance, by pressing a multi-spot button shown in FIG. 4, the multi-spot light measurement is turned on. A part painted with gray color in FIG. 1(a) is a light measuring area. The measured light value obtained at that moment is, as shown in FIG. 1(a), for example, displayed as "250 4.0" on a display device within the viewfinder. This display indicates that the shutter speed is 1/250 second, and the aperture value is f4.0.

Further, on the display device within the viewfinder, the mark "*" indicating that the measured light value has been stored is lighted on.

Then, when a light measurement for the second time is to be performed at the face part of the person being on the left side, it is needed to press the multi-spot button by bringing the focus detecting point to the face of the person being on the left side. In a case where the measured light value at this moment is such that the shutter speed is 1/250 second and the aperture value is f5.6, an average value between the measured light value for the first time and the measured light value for the second time, indicating that the shutter speed is 1/250 and the aperture value is f4.5, is set as a measured light value of the multi-spot light measurement, and the indication "250 4.5" is displayed on the display device within the viewfinder.

Further, as shown in FIG. 1(b), on a display device located on the right side of the viewfinder, deviations of the respective measured light values with respect to the measured light value of the multi-spot light measurement are displayed.

Herein, the average value "ave" is expressed as follows:

$$ave = 1/n \left( \sum_{n=0}^{S} S(i) \right)$$

where, S(n) is a measured light value obtained by the light measurement for the n-th time.

Next, a light measurement for the third time is performed at the wall part of the building. Similar to the light measurement for the second time, the multi-spot button is pressed after moving the focus detecting point to the wall part of the building. In a case where the measured light value at this moment is such that the shutter speed is 1/250 and the aperture value is f2.0, as shown in FIG. 1(c), similar to the previous one, an average value of the measured light values for the three times, indicating that the shutter speed is 1/250 second and the aperture value is f3.5, is displayed as the indication "250 3.5" on the display device within the viewfinder. Further, deviations of the respective measured light values with respect to the measured light value of the multi-spot light measurement are displayed on the display device located on the right side of the viewfinder.

Figure 3:
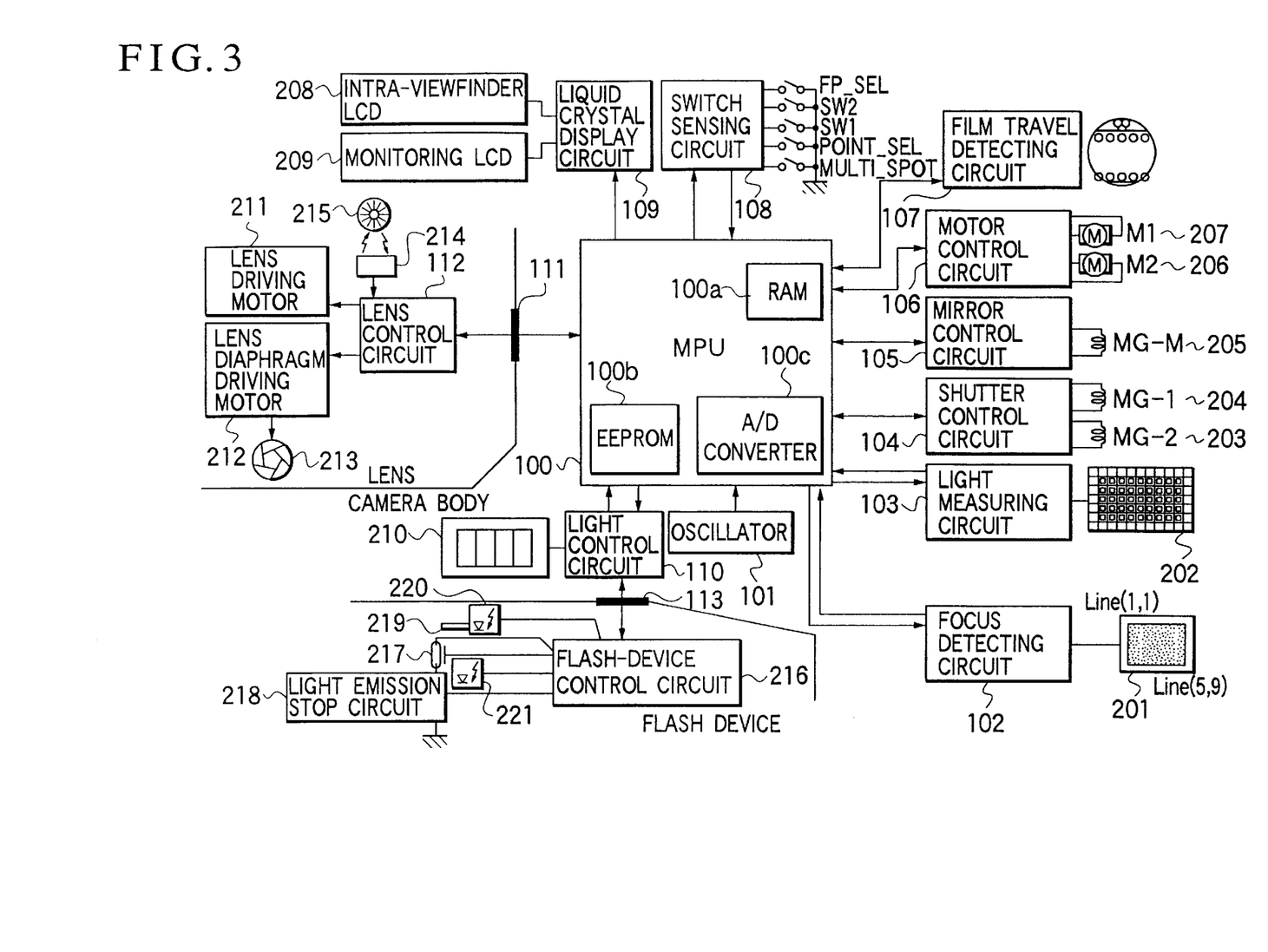
FIG. 3 is a block diagram showing the electric circuit arrangement of a camera in the first and second embodiments present invention.

FIG. 3 is a block diagram showing the electric circuit arrangement of the camera in the first embodiment of the present invention.

In FIG. 3, reference numeral 100 denotes a MPU which is a main part for managing a control of the camera, and there are installed a RAM 100a, an EEPROM 100b which is a non-volatile memory, and an A/D (analog/digital) converter 100c for converting a analog value, such as a measured light value, focus detecting data and the like of the camera, to a digital value. A multi-spot counter to be described later is installed in the RAM 100a.

Reference numeral 101 denotes an oscillator for producing an oscillation frequency with which the MPU 100 is operated.

Reference numeral 102 denotes a focus detecting circuit which is a main part of the automatic focusing operation, and an AF sensor 201 is connected to the focus detecting circuit 102.

The AF sensor 201 in the first embodiment is formed such that 45 pairs of line sensors with 5 rows and 9 columns are arranged in the viewfinder field, and thereby enabling the focus detection of 45 points.

Reference numeral 103 denotes a light measuring circuit, which is connected to a light measuring sensor 202. The light measuring sensor 202 in the first embodiment is composed of 77 light measuring areas with 7 rows and 11 columns.

Reference numeral 104 denotes a shutter control circuit. The shutter control circuit 104, upon receiving a control signal from the MPU 100, causes a leading shutter curtain (leading shutter blade group) to travel by flowing an electric current to a coil (MG-1) 204, and after a predetermined period of time, causes a trailing shutter curtain (trailing shutter blade group) to travel by flowing an electric current to a coil (MG-2) 203. Reference numeral 105 denotes a mirror control circuit, which performs an up movement of a mirror and a down movement of the mirror by flowing an electric current to a coil (MG-M) 205 in accordance with an instruction from the MPU 100. Reference numeral 106 denotes a motor control circuit, which performs the driving of a motor (M1) 206 and a motor (M2) 207 in accordance with an instruction from the MPU 100. The motor (M1) 206 is a motor for performing the charging of the shutter, and the motor (M2) 207 is a motor for performing the winding of a film.

Reference numeral 107 denotes a film travel detecting circuit, which detects the travel of the film with reflected light from the film by irradiating an infrared light ray onto the film during the transport of the film.

Reference numeral 108 denotes a switch sensing circuit, which performs management of operation members and input switches of the camera. For example, the switch sensing circuit 108 senses the states of a light measuring/focus detecting switch SW1, a release switch SW2, a focus detecting point selection switch POINT_SEL, a switch MULTI_SPOT for performing the multi-spot light measurement, and the like.

Reference numeral 109 denotes a liquid crystal display circuit, which performs the lighting control of an intra-viewfinder LCD 208 and a monitoring LCD 209, which is an external liquid crystal display. Reference numeral 110 is a light control circuit, which performs the light emitting control of a flash device, and the light stopping control in response to the output of a light control sensor 210.

Reference numeral 111 denotes communication contacts on the lens side and the camera body side, including terminals for supplying electric power for use in driving the lens and the diaphragm from the camera body, and terminals for supplying control signals from the camera body. Reference numeral 112 denotes a lens control circuit, which receives a control signal from the MPU 100 of the camera body, controls a lens driving motor 211 and a lens diaphragm driving motor 212, and receives an output signal of a photo-interrupter 214 in the lens. The photo-interrupter 214 detects transmitted light of a pulse plate 215 that rotates in association with the driving of the lens and outputs the transmitted light as an output to the lens control circuit 112. Reference numeral 213 denotes a diaphragm, which is driven by the lens diaphragm driving motor 212.

Reference numeral 113 denotes contacts for use in controlling the flash device, including a communication terminal for the camera body and the flash device. Reference numeral 216 denotes a flash-device control circuit of the external flash device, which causes a xenon tube 217 to make light emission in response to an output of the light control circuit 110 of the camera body, and/or performs the control of a light emission stop circuit 218.

Reference numeral 219 denotes a glass fiber, which guides light of the xenon tube 217 to a photodiode 220. The photodiode 220 controls the amount of light emission by detecting an output of the xenon tube 217 during the preliminary light emission. Reference numeral 221 denotes a photodiode, which directly detects an output of the xenon tube 217 and controls a flat light emission by monitoring the output during the preliminary light emission.

FIG. 4 is a top view of the camera in the first embodiment, in which the various switches of the camera are shown. These switches are connected to the switch sensing circuit 108 shown in FIG. 3.

An automatic focusing switch 41 is mounted on a photographic lens L, and is a switch for switching whether a photo-taking operation is performed in an automatic focusing mode or in a manual focusing mode. A light measuring mode selection switch 42 is a switch for selecting one of light measuring modes. A mode selector 43 is a switch for selecting one of photo-taking modes, including a shutter priority AE mode, an aperture priority AE mode and the like.

A main dial 44 and a sub-dial 45 are provided for performing the setting of a shutter speed, an aperture value and a focus detecting point.

A multi-spot button 46 is arranged such that when the multi-spot light measurement is performed, a measured light value is fixed by pressing the multi-spot button 46 at the time when it is desirable to store the measured light value, and an average value between the thus-fixed measured light value and the previously-obtained measured light value is obtained.

A focus detecting point selection mode button 47 is arranged such that when pressing the focus detecting point selection mode button 47, the camera comes into a focus detecting point selection mode, in which the focus detecting point can be selected by a combination of operations of the main dial 44 and the sub-dial 45. Further, the focus detecting point selection mode button 47 also serves as a switch for switching whether the focus detecting point is to be selected in an automatic selection mode or in an optional selection mode.

A release switch 48 is arranged such that by pressing the release switch 48 up to the position of a predetermined stroke, a first stroke switch SW1 for starting the light measuring and focus detecting operations is turned on, and then by pressing the release switch 48 further, a second stroke switch SW2 for starting the shutter release operation is turned on.

An automatic focusing mode switch 49 switches whether the camera is in a mode in which, once an in-focus state is attained, the position of the lens is fixed there, or the camera is in a mode in which an automatic focusing operation is continued until the shutter is operated assuming that an object is a moving body.

A transport mode setting switch 50 is a switch for switching whether the camera is in a mode in which the film is continuously wound, or the camera is in a mode in which only one frame portion of the film is wound at a time.

A focus detecting point number selection switch 51 is a switch which is capable of selecting whether the number of selectable focus detecting points is 11 points or 45 points.

Figure 5:
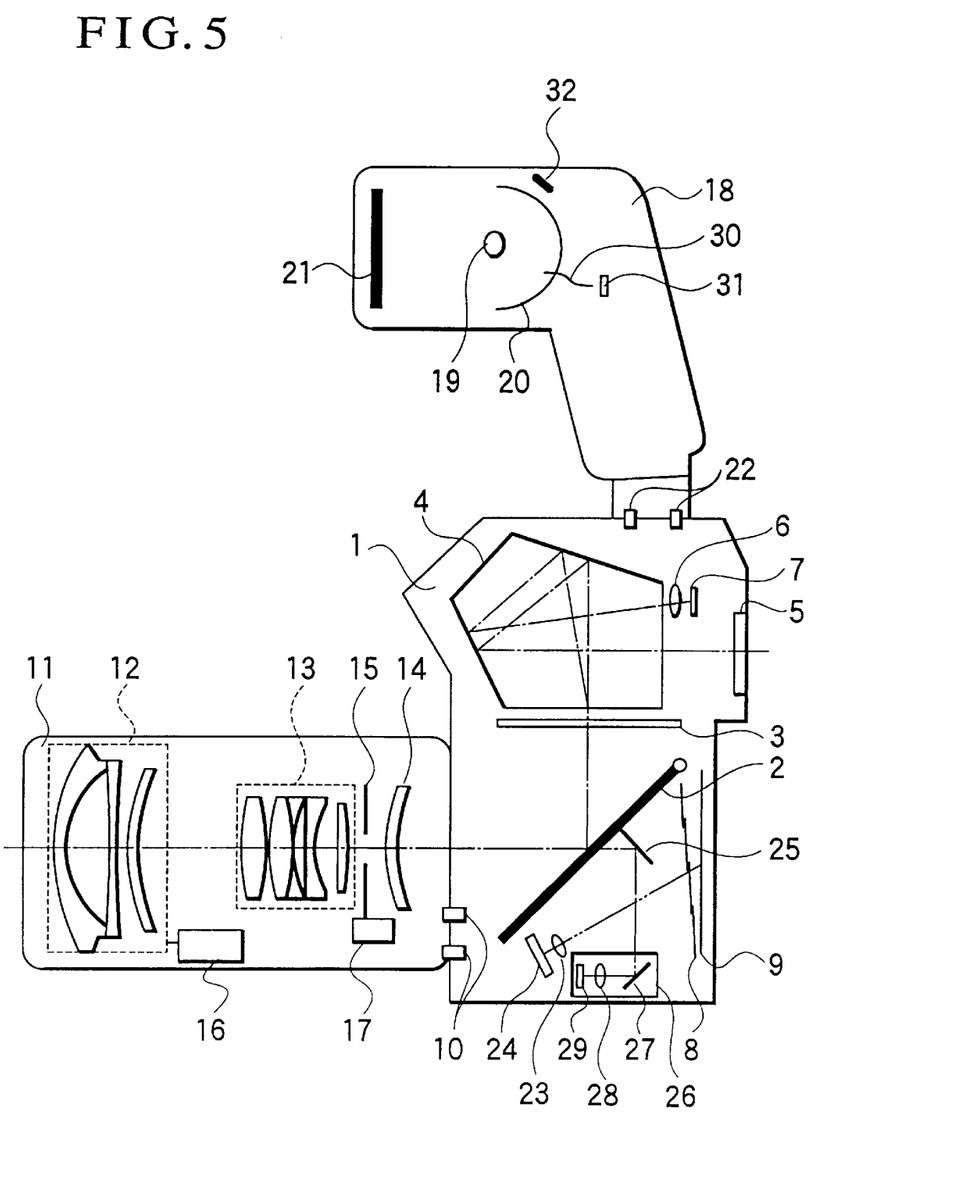
FIG. 5 is a cross-sectional view showing the camera, a lens and a flash device, which are combined, in the first and second embodiments of the present invention.

FIG. 5 is a cross-sectional view of a camera system including the camera in the first embodiment and a lens and a flash device, which are accessories thereof.

In FIG. 5, reference numeral 1 denotes a camera body, which accommodates optical parts, mechanical parts, electric circuits, a film and the like, for use in taking a photograph. Reference numeral 2 denotes a main mirror, which is either diagonally provided to a photographic optical path or withdrawn therefrom in accordance with an observation state or a photography state. The main mirror 2 is also arranged as a half-mirror, and transmits an approximately half of the light from the object to a focus detecting optical system to be described below when the main mirror 2 is diagonally provided. Reference numeral 3 denotes a focusing screen which is placed at a prescribed image forming plane of photo-taking lens groups 12 to 14, reference numeral 4 denotes a pentagonal prism for changing the viewfinder optical path, and reference numeral 5 denotes a viewfinder, with which a photographer can observe a photo-taking image plane by observing the focusing screen 3 through a window. thereof. Reference numerals 6 and 7 respectively denote an image forming lens and a multi-divisional light measuring sensor for measuring the luminance of the object in the observation image plane. The image forming lens 6 makes the focusing screen 3 and the multi-divisional light measuring sensor 7 conjugate to each other through a reflecting optical path in the pentagonal prism 4.

The multi-divisional light measuring sensor 7 is shaped as shown in FIG. 2. Reference numeral 8 denotes a shutter, and reference numeral 9 denotes a photosensitive member such as a silver-halide film or the like.

Reference numerals 23 and 24 respectively denote an image forming lens and a light control sensor for measuring reflected light from the film surface at the time of an exposure. The light emission of the flash device at the time of an exposure is measured by the light control sensor 24, and when it is determined that a predetermined amount of light emission has been reached, the light emission of the flash device is stopped.

Reference numeral 25 denotes a sub-mirror, which guides a light ray from the object toward a focus detecting unit 26 by bending the light ray downward. The focus detecting unit 26 is composed of a secondary image forming mirror 27, a secondary image forming lens 28, a focus detecting line sensor 29 and the like. A focus detecting optical system, which is formed with the secondary image forming mirror 27 and the secondary image forming lens 28, forms a secondary image forming plane of the photographic optical system on the focus detecting line sensor 29. The focus detecting unit 26 implements an Automatic focus detecting device, with an electric circuit to be described below, by detecting a focusing state of the object within the photo-taking image plane with the known phase-difference detecting method, and controlling a focus adjustment mechanism of the photographic lens.

This automatic focus detecting device is arranged to detect a focusing state of each of the predetermined 45 points within the image plane. The locations of the 45 points are shown in FIG. 2.

Reference numeral 10 denotes mount contact points which serve as the known interface between the camera body 1 and the lens. Reference numeral 11 denotes a lens barrel, which is detachably mounted on the camera body 1. Reference numerals 12 to 14 denote photographic lens groups. The first lens group 12 is arranged to adjust the position of focus of the photo-taking image plane by moving along an optical axis. The second lens group 13 is arranged to vary the focal length of the photographic lens, i. e. , vary the magnification of the photo-taking image plane, by moving along the optical axis. The third lens group 14 is a fixed lens. Reference numeral 15 denotes a diaphragm of the photographic lens.

Reference numeral 16 denotes a first-lens-group driving motor, which is capable of adjusting the position of focus automatically by moving the first lens group 12 in the optical axis direction in accordance with the automatic focusing operation. Reference numeral 17 denotes a lens diaphragm driving motor, which causes the diaphragm 15 to be fully opened or to be stopped down.

Reference numeral 18 denotes an external flash device, which is detachably mounted on the camera body 1 and performs a light emission control in accordance with a signal from the camera body 1. Reference numeral 19 denotes a xenon tube, which converts electric current energy to light emission energy. Reference numerals 20 and 21 respectively denote a reflector and a Fresnel lens, which function to focus the light emission energy toward the object efficiently. Reference numeral 22 denotes a known accessory-shoe contact point, which serves as the interface between the camera body 1 and the external flash device 18.

Reference numeral 30 denotes a glass fiber, which guides light emitted by the xenon tube 19 to a monitoring sensor (PD1) 31. The sensor (PD1) 31 is arranged to directly measure the amounts of light for the preliminary light emission and the main light emission of the flash device, for the purpose of controlling the amount of light emission for the main light emission. Reference numeral 32 denotes a monitoring sensor (PD2) for monitoring light emitted by the xenon tube 19. The flash device can make flat light emission by limiting a light emission current of the xenon tube 19 in accordance with an output of the sensor (PD2) 32.

Figure 6:
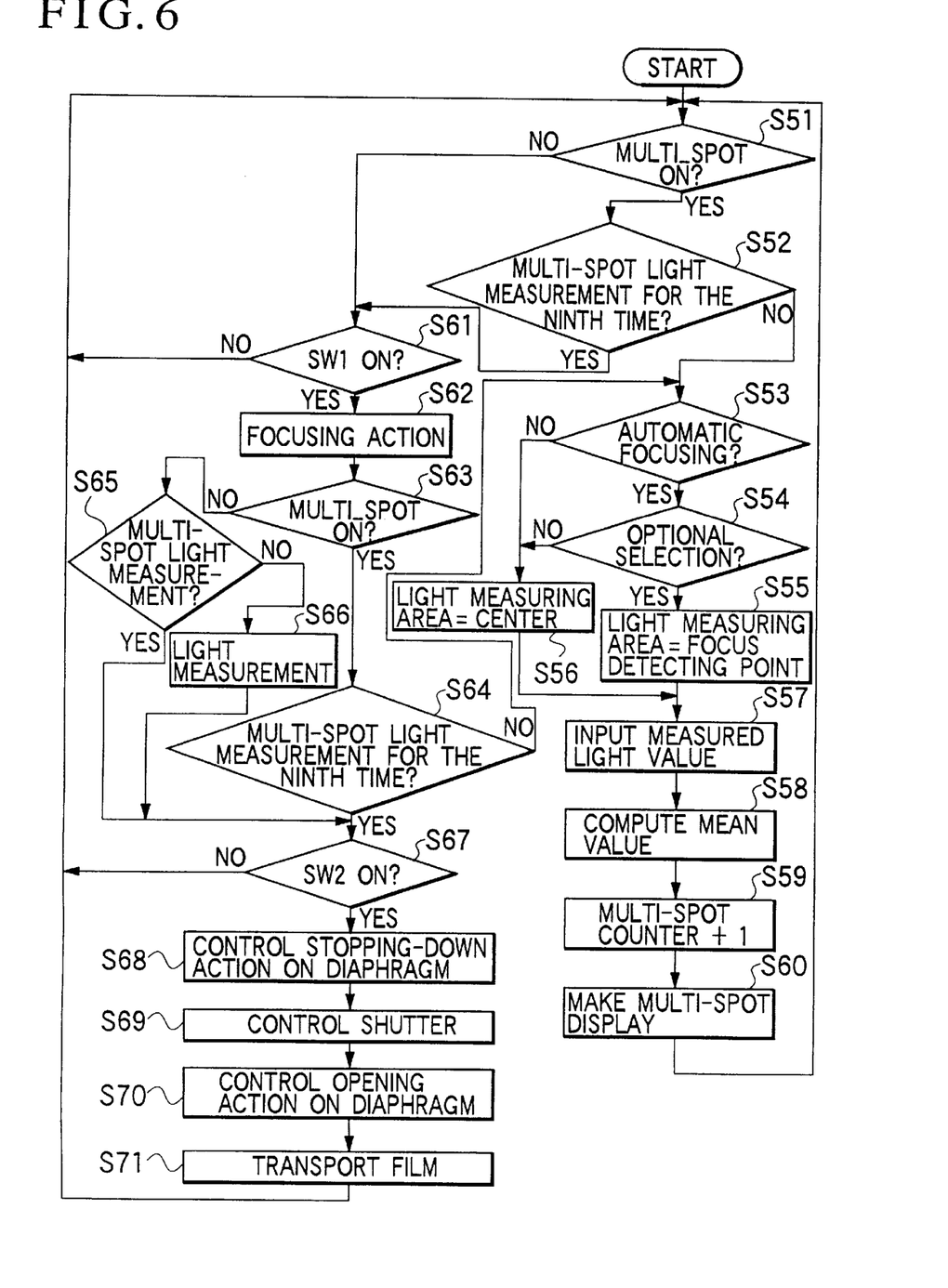
FIG. 6 is a photographing sequence flow chart of the camera in the first embodiment of the present invention.

FIG. 6 is a flow chart showing a photography sequence of the camera in the first embodiment.

In a step S61, a check is made to find if the release switch SW1 of the camera is turned on. If not, the flow comes into a waiting state.

Step S51: When the switch MULTI_SPOT is turned on by pressing the multi-spot button 46, the flow proceeds to a step S52. It is to be noted that, when the switch MULTI_SPOT is turned on by pressing the multi-spot button 46, the multi-spot light measurement for the first time is performed, and when the multi-spot light measurement for the next time is to be performed, it is necessary to turn on the switch MULTI_SPOT by pressing the multi-spot button 46 again.

Step S52: A check is made to find for which time the multi-spot light measurement is. If the multi-spot light measurement is for the ninth time or the subsequent time, the flow proceeds to the step S61. If the multi-spot light measurement is for up to the eighth time, the flow proceeds to a step S53.

Step S53: A check is made to find if the camera is in the automatic focusing mode. If so, the flow proceeds to a step S54. If the camera is in the manual focusing mode, the flow proceeds to a step S56.

Step S54: A check is made to find if the focus detecting point is subjected to an optional selection. If so, the flow proceeds to a step S55. If the focus detecting point is not subjected to the optional selection, i. e. , subjected to an automatic selection, the flow proceeds to the step S56.

Step S55: Since the focus detecting point is subjected to the optional selection, the light measuring area is made to coincide with the focus detecting point.

Step S56: Because the focus detecting point is subjected to the automatic selection or the camera is in the manual focusing mode, an area at the center of the image plane is selected as the light measuring area. Although, in the case of the first embodiment, the central area of the image plane is selected as the light measuring area, such a method may be also employed that the photographer fixes the light measuring area to a specific area prior to a photo-taking operation and causes the camera to store information on the light measuring area.

Step S57: A light measurement is performed in the selected light measuring area, and the measured light value is stored in the RAM 100a which is installed in the MPU 100 of the camera.

Step S58: An averaging calculating operation of the multi-spot measured light values is performed.

Step S59: The value of the multi-spot counter in the RAM 100a *of the MPU 100 is incremented by one.*

Step S60: A multi-spot light measurement display is made within the viewfinder of camera. The multi-spot light measurement display is, for example, shown in FIGS. 1(*a*) to 1(*c*). Then, the flow returns to the step S51.

Step S61: A check is made to find if the first stroke switch SW1 is turned on. If so, the flow proceeds to a step S62.

Step S62: A focusing action is performed, and then the flow proceeds to a step S63.

Step S63: A check is made to find if the switch MULTI_SPOT is turned on. If so, the flow proceeds to a step S64, If not, the flow proceeds to a step S65.

Step S64: A check is made to find for which time the multi-spot light measurement is. If the multi-spot light measurement is for the ninth time or the subsequent time, the flow proceeds to a step S67 without performing the multi-spot light measurement. If the multi-spot light measurement is for up to the eighth time, the flow returns to the step S53.

Step S65: A check is made to find if the multi-spot light measurement has been performed. If the multi-spot light measurement has been performed, the flow proceeds to the step S67. If the multi-spot light measurement has not been performed, it is determined that the camera is in the ordinary light measuring mode, and the flow proceeds to a step S66.

Step S66: A conventional light measuring calculating operation is performed.

Step S67: A check is made to find if the second stroke switch SW2, which is the release switch, is turned on. If so, the flow proceeds to a step S68.

Step S68: A stopping-down action on the diaphragm of the photographic lens is performed.

Step S69: The shutter is controlled on the basis of the measured light value.

Step S70: An opening action on the diaphragm of the photographic lens is performed.

Step S71: The film is transported.

[Second Embodiment]

Figure 7A:
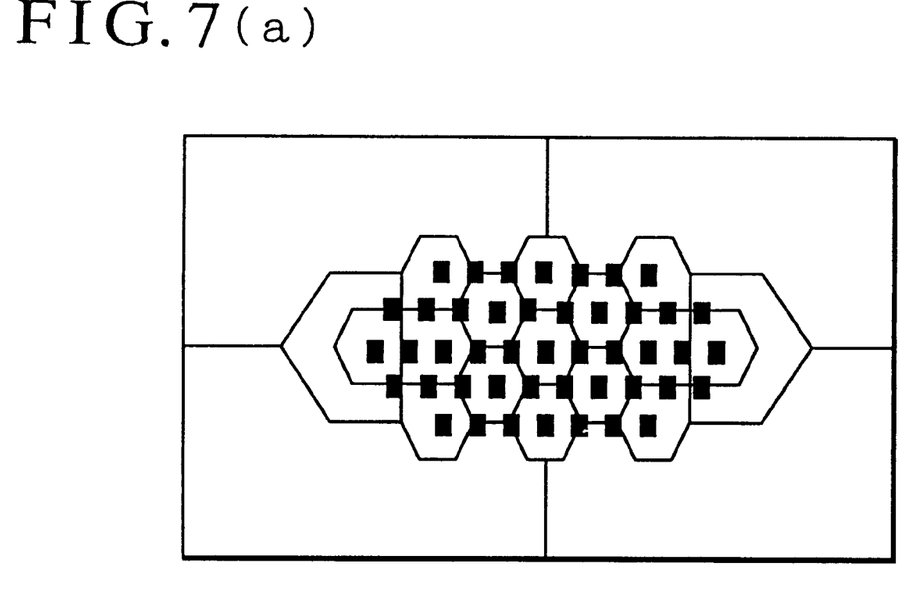
FIGS. 7(a) and 7(b) are diagrams showing focus detecting points and light measuring areas in the second embodiment of the present invention.
Figure 7B:
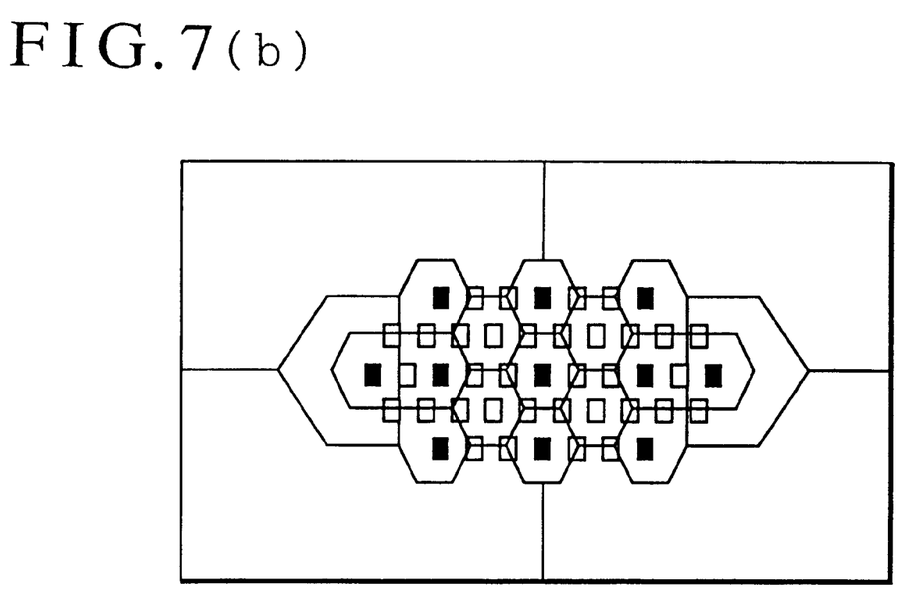
Figure 12:
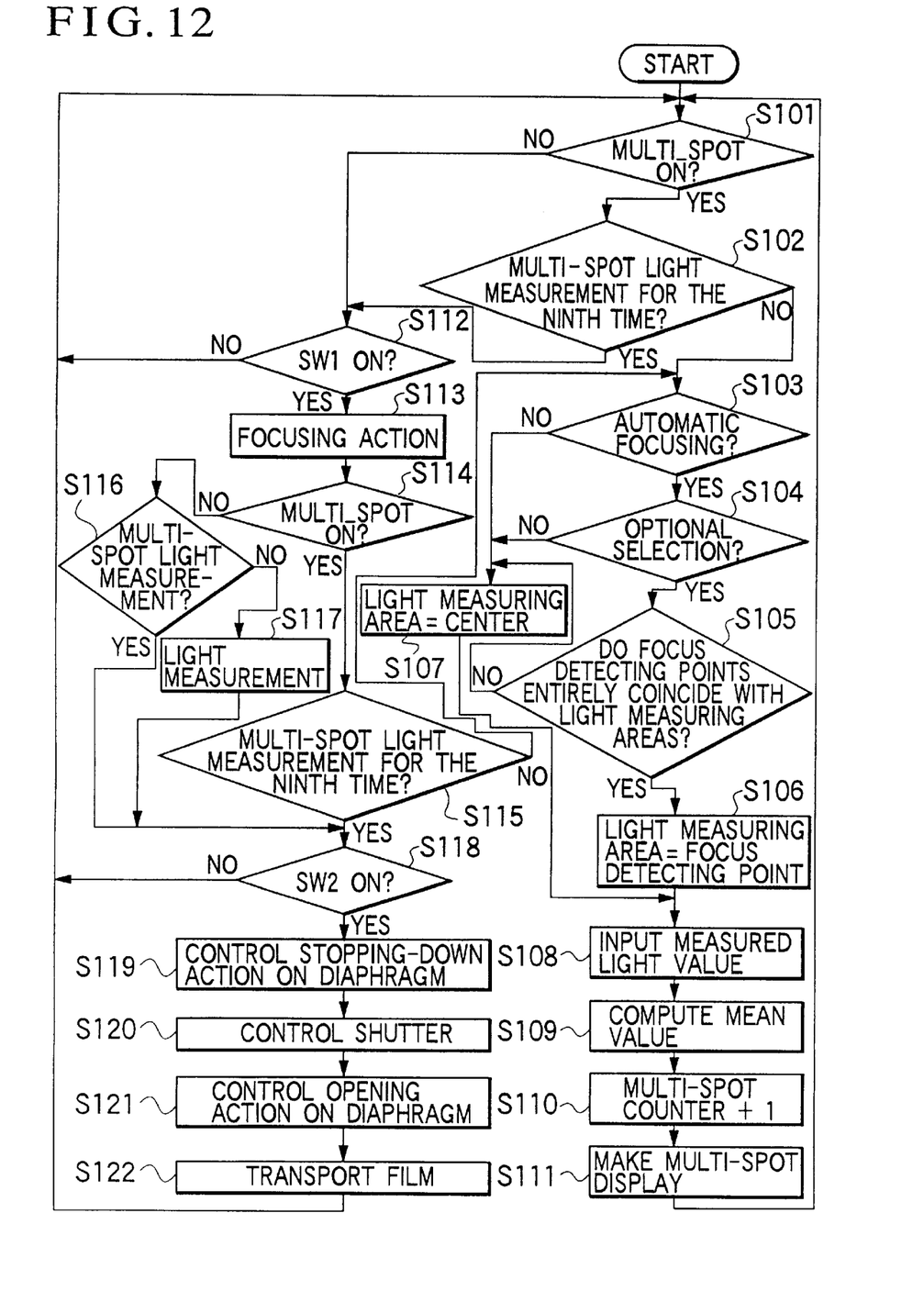
FIG. 12 is a photographing sequence flow chart of the camera in the second embodiment of the present invention.
Figure 13A:
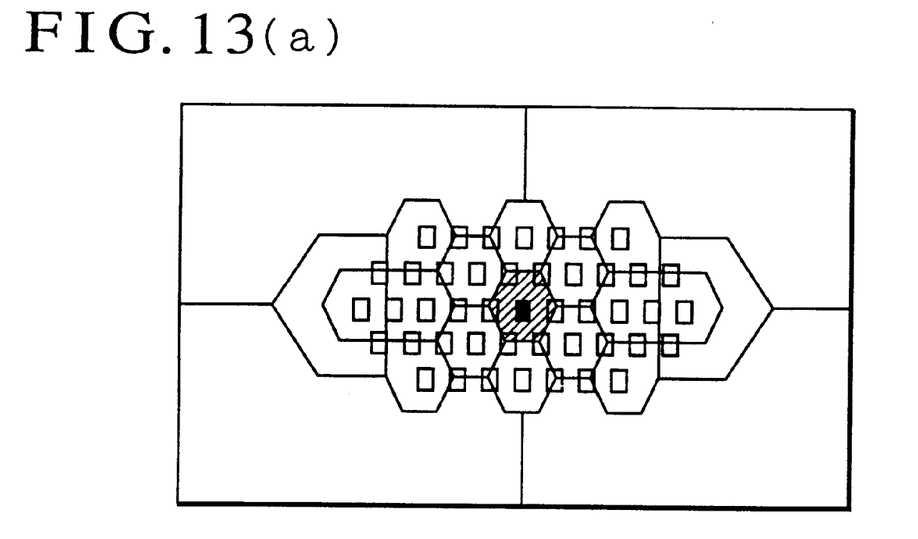
FIGS. 13(a) and 13(b) are diagrams showing light measuring areas in which the multi-spot light measurement is available in the camera in the second embodiment of the present invention.
Figure 13B:
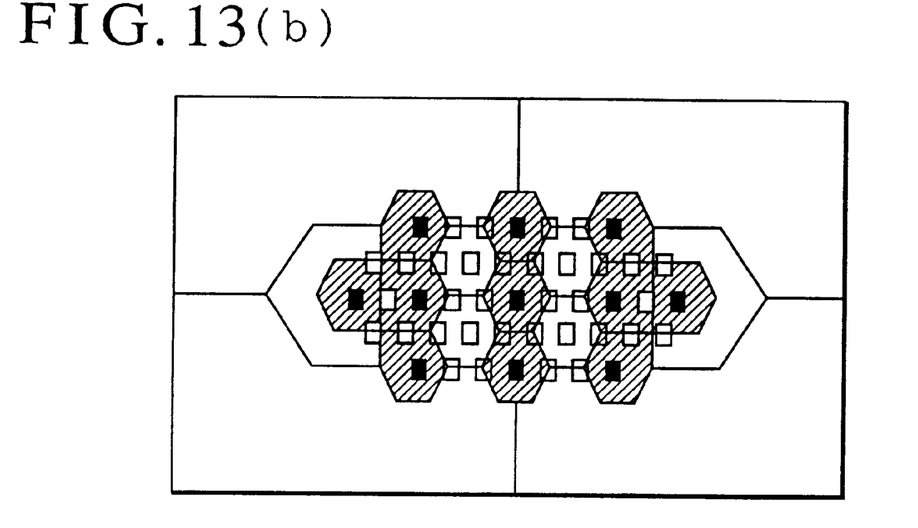

FIGS. 7(*a*) and 7(*b*) to FIGS. 13(*a*) and 13(*b*) show a second embodiment of the present invention.

Although the first embodiment refers to a selection method employed when the focus detecting points and the light measuring areas coincide with each other in area, the second embodiment refers to a selection method employed when the focus detecting points and the light measuring areas do not coincide with each other in shape (area).

FIGS. 7(*a*) and 7(*b*) are diagrams showing the focus detecting points and the light measuring areas as viewed from on a viewfinder field in the camera in the second embodiment.

In each of FIGS. 7(*a*) and 7(*b*), smaller squares represent the focus detecting points, and the selectable focus detecting points are painted in black.

The second embodiment is characterized in that the number of selectable focus detecting points can be selected as either 45 points or 11 points, and a selection of the number of selectable focus detecting points is performed by using the focus detecting point number selection switch 51 shown in FIG. 4.

In the case of FIG. 7(*a*), one focus detecting point can be selected from among 45 focus detecting points, and the focus detecting points and the light measuring areas do not coincide with each other.

In the case of FIG. 7(*b*), one focus detecting point can be selected from among 11 focus detecting points, and the focus detecting points and the light measuring areas are associated with each other.

In the case of FIG. 7(a), since there are many areas in which the focus detecting point and the light measuring area do not coincide with each other, the light measuring area is always fixed to the center of the image plane, as shown in FIG. 13(a).

In case of FIG. 7(b), since the focus detecting point and the light measuring area are associated with each other, the selectable light measuring areas are 11 areas (as hatched areas), as shown in FIG. 13(b), and the light measuring area is associated with the movement of the focus detecting point.

In the following, referring to FIGS. 8 to 11, a photographing method for the multi-spot light measurement in the second embodiment will be described.

Figure 8:
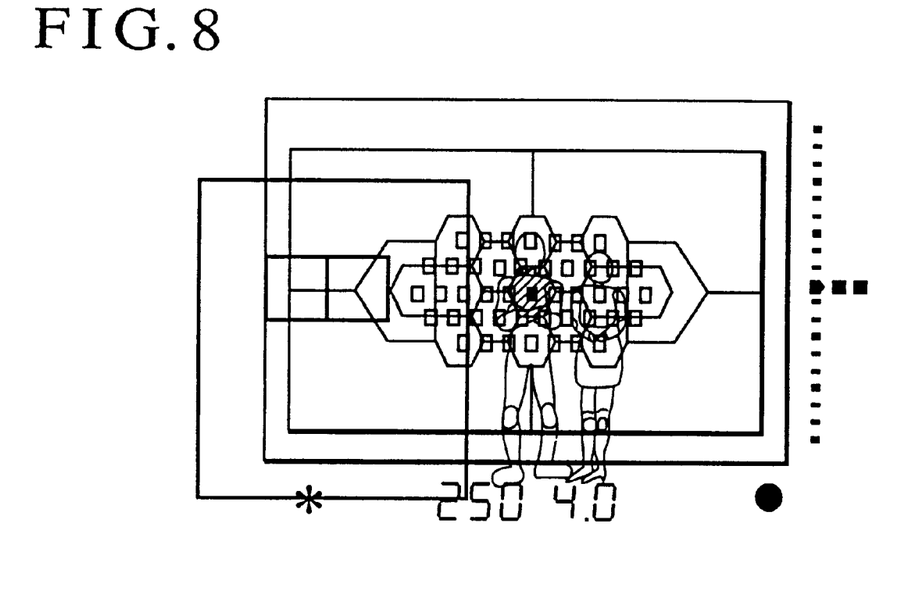
FIG. 8 is a diagram showing the multi-spot light measurement for the first time in the multi-spot light measuring mode in the second embodiment of the present invention.

In FIGS. 8 to 11, similar to the case shown in FIGS. 1(a) to 1(c), it is assumed that two persons exist as an object to be photographed with a wall of the building being a background image, and similar to the first embodiment, a light measurement for the first time is performed at the chest part of the person situated on the left side. Since the focus detecting point and the light measuring area are not associated with each other in the second embodiment, it is necessary to implement a framing. At this moment, by pressing the multi-spot button 46 shown in FIG. 4, the camera comes into the multi-spot light measurement mode. As shown in FIG. 8, the hatched part is the light measuring area. The measured light value obtained at this moment is displayed on the display device within the viewfinder as "250 4.0", which indicates that the shutter speed is 1/250 and the aperture value is f4.0. Further, the mark "*" indicating that the measured light value has been stored is lighted on.

Figure 9:
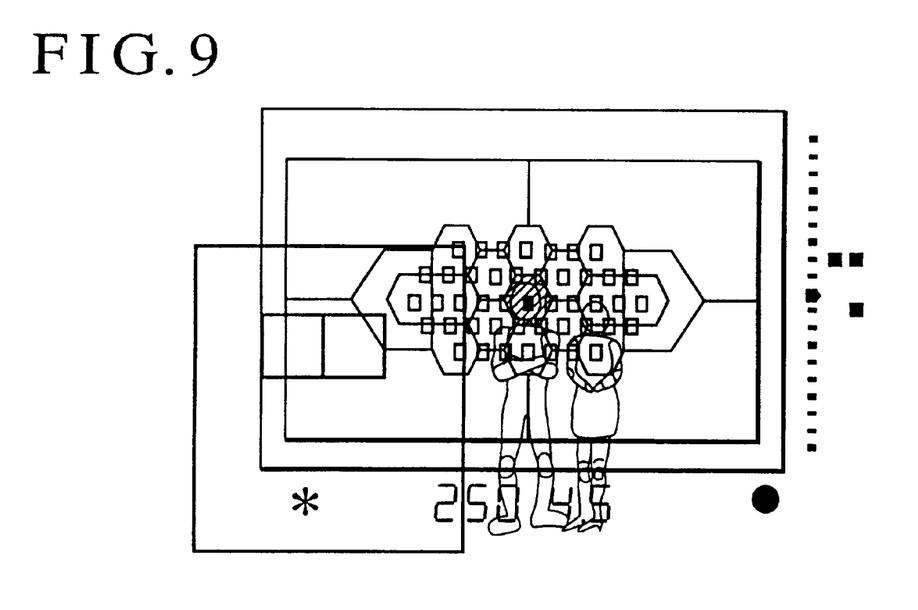
FIG. 9 is a diagram showing the multi-spot light measurement for the second time in the multi-spot light measuring mode in the second embodiment of the present invention.

Then, when a light measurement at the face part of the person situated on the left side is to be performed, it is necessary to press the multi-spot button 46 after bringing the central part of the viewfinder to the face of the person situated on the left side. In a case where the measured light value at this moment is such that the shutter speed is 1/250 and the aperture value is f5.6, an average value between the measured light value for the first time and the measured light value for the second time, indicating that the shutter speed is 1/250 and the aperture value is f4.5, is set as a measured light value of the multi-spot light measurement, and the indication "250 4.5" is displayed as shown in FIG. 9. Further, on the display device located on the right side of the viewfinder, deviations of the respective measured light values with respect to the measured light value of the multi-spot light measurement are displayed.

Herein, the average value "ave" is expressed as follows:

$$ave = 1/n \left( \sum_{n=0}^{S} S(i) \right)$$

where, S(n) is a measured light value obtained by the light measurement for the n-th time.

Figure 10:
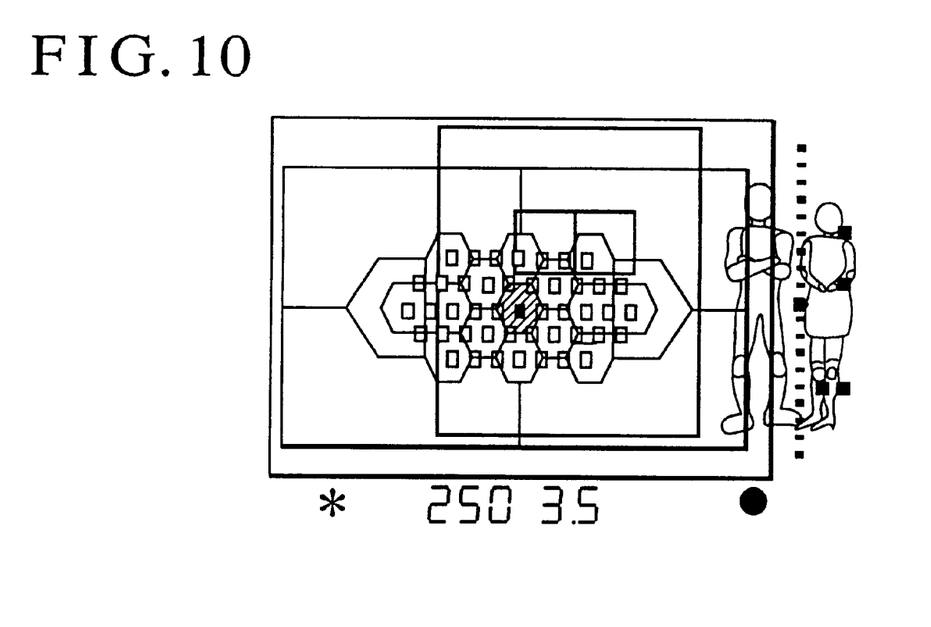
FIG. 10 is a diagram showing the multi-spot light measurement for the third time in the multi-spot light measuring mode in the second embodiment of the present invention.

Next, a light measurement for the third time is performed at the wall part of the building. Similar to the light measurement for the second time, the multi-spot button 46 is pressed after moving the center of the light measuring area to the wall part of the building by performing the framing. In a case where the measured light value at this moment is such that the shutter speed is 1/250 and the aperture value is f2.0, similar to the previous one, an average value of the measured light values for the three times, indicating that the shutter speed is 1/250 and the aperture value is f3.5, is displayed as the indication "250 3.5", as shown in FIG. 10. Further, deviations of the respective measured light values with respect to the measured light value of the multi-spot light measurement are displayed on the display device located on the right side of the viewfinder.

Figure 11:
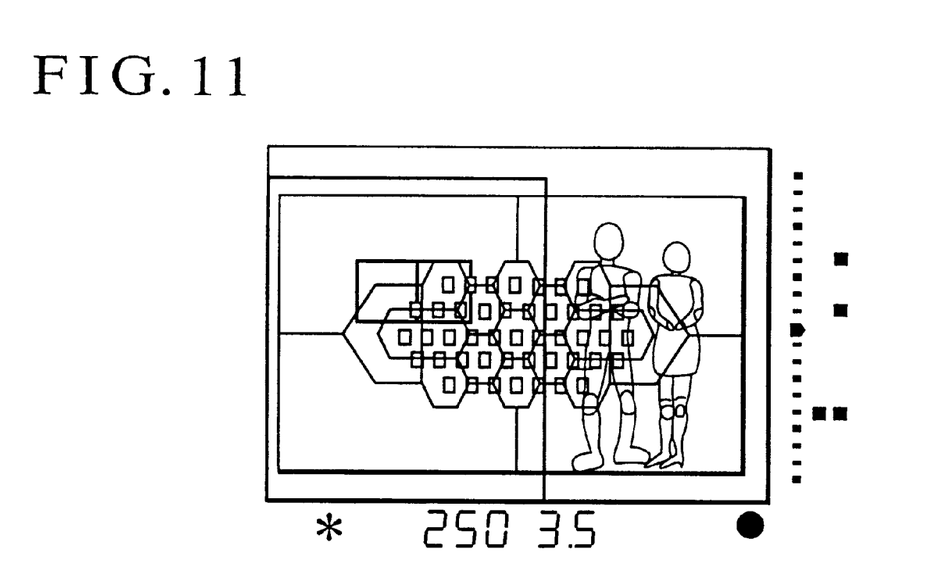
FIG. 11 is a diagram showing a photographing state in the multi-spot light measuring mode in the second embodiment of the present invention.

After the above operation, as shown in FIG. 11, a framing on a composition that is to be photographed is performed by the photographer, and then the camera is brought into the release operation.

FIG. 12 is a flow chart showing a photography sequence of the camera in the second embodiment.

Step S112: A check is made to find if the release switch SW1 of the camera is turned on. If not, the flow comes into a waiting state.

Step S101: When the switch MULTI_SPOT is turned on, the flow proceeds to a step S102.

Step S102: A check is made to find for which time the multi-spot light measurement is. If the multi-spot light measurement is for the ninth time or the subsequent time, the flow proceeds to the step S112. If the multi-spot light measurement is for up to the eighth time, the flow proceeds to a step S103.

Step S103: A check is made to find if the camera is in the automatic focusing mode. If so, the flow proceeds to a step S104. If the camera is in the manual focusing mode, the flow proceeds to a step S107.

Step S104: A check is made to find if the focus detecting point is subjected to an optional selection. If so, the flow proceeds to a step S105. If the focus detecting point is not subjected to the optional selection, i. e. , subjected to an automatic selection, the flow proceeds to the step S107.

Step S105: A check is made to find if the selectable focus detecting points entirely coincide with the light measuring areas. If so, the flow proceeds to a step S106. If not, the flow proceeds to the step S107.

Step S107: Because the focus detecting point is subjected to the automatic selection or the camera is in the manual focusing mode, or because the focus detecting points and the light measuring areas do not coincide with each other, an area at the center of the image plane is selected as the light measuring area. Although, in the case of the second embodiment, the central area of the image plane is selected as the light measuring area, such a method may be also employed that the photographer fixes the light measuring area to a specific area prior to a photo-taking operation and causes the camera to store information on the light measuring area.

Step S108: A light measurement is performed in the selected light measuring area, and the measured light value is stored in the RAM 100a which is installed in the MPU 100 of the camera.

Step S109: An averaging calculating operation of the multi-spot measured light values is performed.

Step S110: The value of the multi-spot counter in the RAM 100a of the MPU 100 is incremented by one.

Step S111: A multi-spot light measurement display is made within the viewfinder of camera. The multi-spot light measurement display is, for example, shown in FIGS. 8 to 10. Then, the flow returns to the step S101.

Step S112: A check is made to find if the first stroke switch SW1 is turned on. If so, the flow proceeds to a step S113.

Step S113: A focusing action is performed, and then the flow proceeds to a step S114.

Step S114: A check is made to find if the switch MULTI_SPOT is turned on. If so, the flow proceeds to a step S115, If not, the flow proceeds to a step S116.

Step S115: A check is made to find for which time the multi-spot light measurement is. If the multi-spot light measurement is for the ninth time or the subsequent time, the flow proceeds to a step S118 without performing the multi-spot light measurement. If the multi-spot light measurement is for up to the eighth time, the flow returns to the step S103.

Step S116: A check is made to find if the multi-spot light measurement has been performed. If the multi-spot light measurement has been performed, the flow proceeds to the step S118. If the multi-spot light measurement has not been performed, it is determined that the camera is in the ordinary light measuring mode, and the flow proceeds to a step S117.

Step S117: A conventional light measuring calculating operation is performed.

Step S118: A check is made to find if the second stroke switch SW2, which is the release switch, is turned on. If so, the flow proceeds to a step S119.

Step S119: A stopping-down action on the diaphragm of the photographic lens is performed.

Step S120: The shutter is controlled on the basis of the measured light value.

Step S121: An opening action on the diaphragm of the photographic lens is performed.

Step S122: The film is transported.

Further, although, in the above described embodiments, a specific measured light value is obtained by simply averaging the measured light values for the respective times with the preset calculating operation, the calculating operation in the present invention includes not only the simple averaging operation but also, for example, such calculating operations as (a) averaging after weighting by the number of times of light measurements, (b) obtaining an intermediate value by considering the maximum and minimum values of the measured light values for a plurality of times of light measurements, and (c) averaging after disregarding the measured light values of the high luminance (such as the sun and the like) and of the low luminance (such as the ground and the like) or after replacing them with the predetermined values.

As has been described above, according to each of the embodiments, in a camera having a plurality of focus detecting points and a plurality of light measuring areas, the focus detecting points are made to be associated with the light measuring areas available for the multi-spot light measurement, so that there is an advantage that an enhancement of an operability of the camera may be attempted. Further, even when the camera is fixed, for example, by using a tripod, it makes possible to perform the multi-spot light measurement after having decided a composition of photography.

Further, it makes possible to provide a simpler and easier operability as the focus detecting point selecting operation and the light measuring area selecting operation are associated with each other.

The present invention may be embodied in other specific forms without departing from the spirit or essential characteristics thereof. The above-described embodiments are, therefore, to be considered in all respects as illustrative only and not restrictive, the scope of the invention is indicated by the appended claims rather than by the foregoing description, and all changes which come within the meaning and range of equivalency of the claims are, therefore, intended to be embraced therein.

What is claimed is:

1. A camera, comprising:
   a focus detecting device having a plurality of focus detecting points and capable of selecting a particular focus detecting point from among the plurality of focus detecting points; and
   a light measuring device having a plurality of light measuring areas,
   wherein said light measuring device, when performing a plurality of times of light measuring operations, converts, into a particular measured light value by using a preset calculating operation, a plurality of measured light values each of which is obtained at each time of light measuring operation in a light measuring area set correspondingly with selection of a focus detecting point in said focus detecting device.

2. A camera according to claim 1, wherein said preset calculating operation is used to convert, into said particular measured light value, a plurality of measured light values obtained up to each time of light measuring operation.

3. A camera according to claim 1, wherein said preset calculating operation is used to convert said plurality of measured light values into said particular measured light value by averaging said plurality of measured light values.

4. A camera according to claim 2, wherein said preset calculating operation is used to convert said plurality of measured light values into said particular measured light value by averaging said plurality of measured light values.

5. A camera according to claim 1, further comprising:
   a display device capable of simultaneously displaying said plurality of measured light values obtained at each time of light measuring operation and said particular measured light value.

6. A camera according to claim 5, wherein said display device also displays a deviation between each of said plurality of measured light values and said particular measured light value.

7. A camera according to claim 1, wherein said light measuring device varies setting of a light measuring area at each time of light measuring operation in accordance with a photo-taking mode.

8. A camera according to claim 7, wherein, when a particular photo-taking mode is set, said light measuring device fixes a light measuring area even if any of said plurality of focus detecting points is selected.

9. A camera according to claim 8, wherein said particular photo-taking mode is a manual focusing mode.

10. A camera according to claim 8, wherein said particular photo-taking mode is a mode in which a focus detecting point is selected automatically with a predetermined program.

11. A camera according to claim 1, wherein said focus detecting device is capable of selecting a particular focus detecting point from among the plurality of focus detecting points in response to a manual operation.

12. A camera according to claim 1, further comprising:
   a display device which displays locations of said plurality of focus detecting points and partitioned areas of said plurality of light measuring areas, said display device distinguishably displaying a focus detecting point selected by said focus detecting device and other non-selected focus detecting points.

13. A camera, comprising:
   a focus detecting device having a plurality of focus detecting points and capable of selecting a particular focus detecting point from among the plurality of focus detecting points; and
   a light measuring device having a plurality of light measuring areas,
   wherein said light measuring device, when performing a plurality of times of light measuring operations, converts, into a particular measured light value by using a preset calculating operation, a plurality of measured light values each of which is obtained at each time of light measuring operation, while using, if a focus detecting point selected by said focus detecting device is contained in a light measuring area, a measured light value obtained in said light measuring area containing the selected focus detecting point, or while using, if the selected focus detecting point is not contained in any light measuring area, a measured light value obtained in a preset particular light measuring area.

14. A camera according to claim 13, wherein said preset calculating operation is used to convert, into said particular measured light value, a plurality of measured light values obtained up to each time of light measuring operation.

15. A camera according to claim 13, wherein said preset calculating operation is used to convert said plurality of measured light values into said particular measured light value by averaging said plurality of measured light values.

16. A camera according to claim 14, wherein said preset calculating operation is used to convert said plurality of measured light values into said particular measured light value by averaging said plurality of measured light values.

17. A camera according to claim 13, further comprising:
a display device capable of simultaneously displaying said plurality of measured light values obtained at each time of light measuring operation and said particular measured light value.

18. A camera according to claim 17, wherein said display device also displays a deviation between each of said plurality of measured light values and said particular measured light value.

19. A camera according to claim 13, wherein said preset particular light measuring area is located at a central portion of an image plane.

* * * * *